E. I. White.
Hay Fork.
No. 79,711.    Patented July 7, 1868
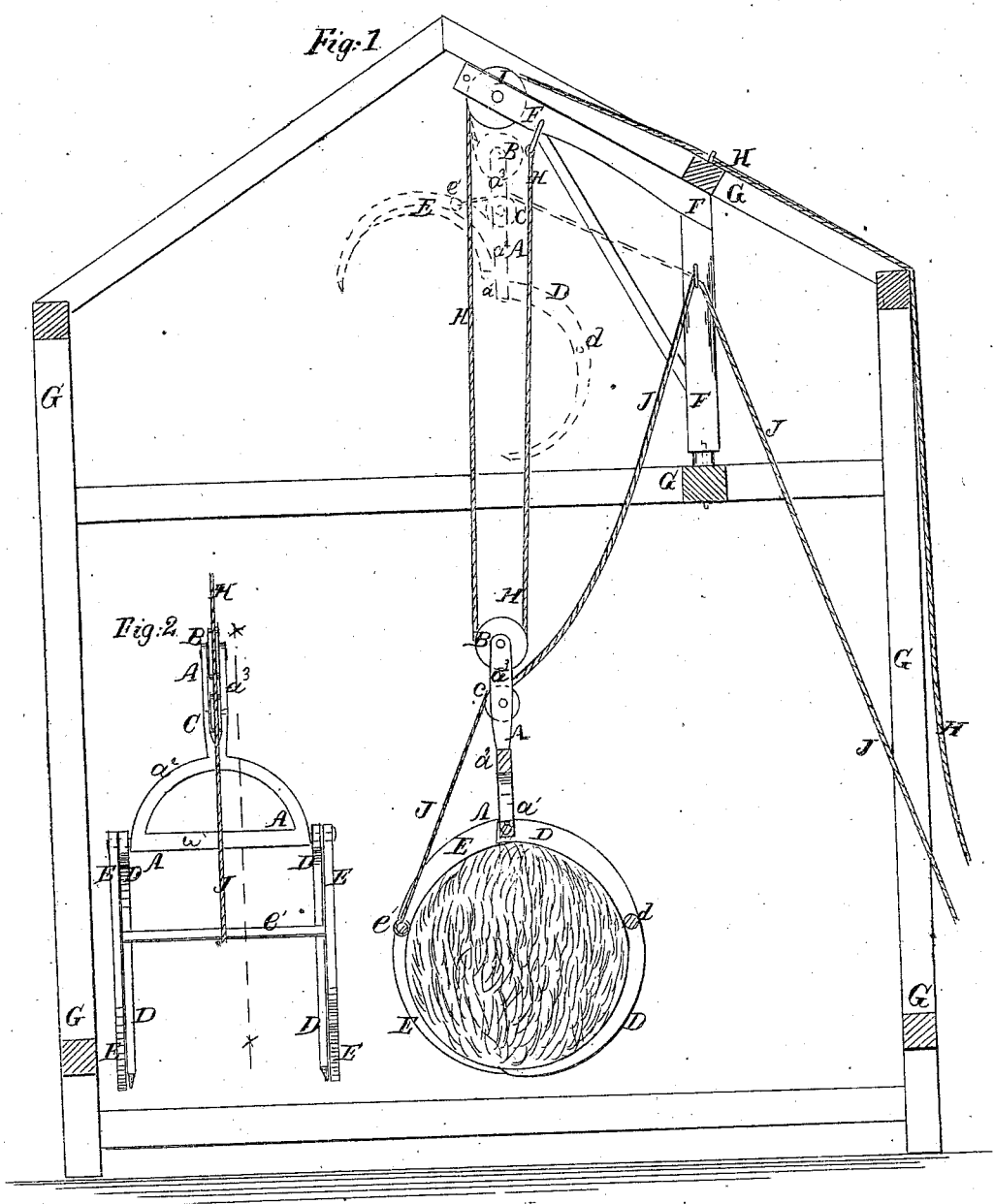
Witnesses
H. C. Ashkettle
Wm. A. Morgan
Inventor
E. I. White
per Munn & Co.
Attorneys

United States Patent Office.

E. I. WHITE, OF LOCKE, NEW YORK.

Letters Patent No. 79,711, dated July 7, 1868.

IMPROVEMENT IN HORSE HAY-FORKS.

The Schedule referred to in these Letters Patent and making part of the same.

TO ALL WHOM IT MAY CONCERN:

Be it known that I, E. I. WHITE, of Locke, in the county of Cayuga, and State of New York, have invented a new and useful Improvement in Horse Hay-Forks; and I do hereby declare that the following is a full, clear, and exact description thereof, which will enable others skilled in the art to make and use the same, reference being had to the accompanying drawings, forming part of this specification.

Figure 1 is a sectional view of my improved hay-fork, taken through the line $x$ $x$, fig. 2, and showing it suspended from the crane-arm by the hoisting-rope.

Figure 2 is a side view of the fork.

Similar letters of reference indicate corresponding parts.

My invention has for its object to furnish a neat, simple, convenient, and effective hay-fork, and which shall at the same time be strong, not liable to get out of order, and easily operated; and it consists in the construction of the fork, and in the combination therewith of the parts by which it is operated, as hereinafter more fully described.

A is the shank of the fork, which is made in substantially the manner herein shown and described, that is to say, consisting of a horizontal bar, $a^1$, attached near its ends to the ends of the curved bar $a^2$, from the middle part of the convex side of which projects a slotted arm, $a^3$, within the slot of which are pivoted the pulleys B and C.

D are two curved tines, which are connected and held in their proper relative position by a cross-bar, $d'$, and through the upper ends of which are formed square holes, fitting upon the squared parts of the ends of the bar $a^1$ of the shank A, so as to connect the said tines D rigidly to the shank A.

E are the curved tines, connected together and held in their proper relative position by the cross-bar $e'$, and through the upper ends of which are formed round holes, fitting upon the rounded parts of the ends of the horizontal bar $a^1$ of the shank A, so as to pivot the said tines E to the said shank A.

F is a crane, which should be pivoted to the frame G of the barn, in such a way that it may swing the loaded fork over the beam, so as to discharge the hay into the mow.

H is the hoisting-rope, one end of which is attached to the projecting arm of the crane F, which passes down and around the pulley B, up and around the pulley I, pivoted to the end of the projecting arm of the crane F, and thence over suitable guide-pulleys to the place where the power is applied, said guide-pulleys being so arranged that when the loaded fork has been raised to the crane, the said hoisting-rope may swing the crane and bring the loaded fork over the mow.

J is the tripping-rope, one end of which is attached to the middle part of the cross-bar $e'$ of the pivoted tines E.

The rope J then passes over the pulley C, up to the crane F, and thence over suitable guide-pulleys to a convenient place to be reached and operated.

I claim as new, and desire to secure by Letters Patent—

The construction of the shank A, consisting of the cross-bar $a^1$, whose reduced ends are fitted rigidly in the tines D, and turn freely in the tines E, and whose arc $a^2$ is provided with a slotted extension; $a^3$, carrying the hoisting and tripping-pulleys B C, all arranged as described for the purpose specified.

E. I. WHITE.

Witnesses:
JONATHAN DONALD, Jr.,
DANIEL A. WHITE.